US011842222B2

(12) United States Patent
Kramer et al.

(10) Patent No.: US 11,842,222 B2
(45) Date of Patent: *Dec. 12, 2023

(54) USING SCRIPTS TO BOOTSTRAP APPLICATIONS WITH METADATA FROM A TEMPLATE

(71) Applicant: Amazon Technologies, Inc., Seattle, WA (US)

(72) Inventors: Reto Kramer, Sammamish, WA (US); Christopher Whitaker, Sammamish, WA (US); Adam M. Thomas, Seattle, WA (US); Richard C. Edwards, Jr., Seattle, WA (US); Avinash Jaisinghani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/073,129

(22) Filed: Oct. 16, 2020

(65) Prior Publication Data

US 2021/0133002 A1    May 6, 2021

Related U.S. Application Data

(63) Continuation of application No. 16/148,921, filed on Oct. 1, 2018, now Pat. No. 10,810,049, which is a
(Continued)

(51) Int. Cl.
*G06F 9/50* (2006.01)
*G06F 9/4401* (2018.01)
(Continued)

(52) U.S. Cl.
CPC .......... *G06F 9/5072* (2013.01); *G06F 9/4401* (2013.01); *G06F 9/445* (2013.01);
(Continued)

(58) Field of Classification Search
CPC ....... G06F 9/5072; G06F 9/4401; G06F 9/445
See application file for complete search history.

(56) References Cited

U.S. PATENT DOCUMENTS 6,766,364 B2   7/2004  Moyer et al.
7,246,200 B1   7/2007  van Rietschote et al.
(Continued)

FOREIGN PATENT DOCUMENTS

CN      102073549      5/2011
JP      2004086769     3/2004
(Continued)

OTHER PUBLICATIONS

Anonymous, "Timeout (computing)," Wikipedia, Ed. Jacopo Werther, May 27, 2012, retrieved from URL:https://en.wikipedia.org/w/index.php?title= Timeout_(computing)&oldid=494602899 Feb. 11, 2021.
(Continued)

*Primary Examiner* — Suraj M Joshi
(74) *Attorney, Agent, or Firm* — Robert C. Kowert; Kowert, Hood, Munyon, Rankin & Goetzel, P.C.

(57) ABSTRACT

Systems and methods are described for bootstrapping an application with metadata specified in a template. The template specifies a stack of resources that will be used to execute an application and also includes a set of metadata for customizing the resources and the application. When the system receives the template, it instantiates a compute node which will execute the application. The compute node may contain at least one initialization script for bootstrapping the application with the metadata contained in the template. This functionality allows users to bootstrap the application running on the compute node with data from within the template that was used to create the stack of resources for executing the application. In this manner, metadata, configuration files,
(Continued)

package names and versions can be passed by the application owner to the remote compute node.

20 Claims, 6 Drawing Sheets

Related U.S. Application Data continuation of application No. 13/424,160, filed on Mar. 19, 2012, now Pat. No. 10,089,152.

(51) Int. Cl.
- *G06F 9/445* (2018.01)
- *G06F 8/61* (2018.01)
- *G06F 8/71* (2018.01)

(52) U.S. Cl.
CPC .................. *G06F 8/61* (2013.01); *G06F 8/71* (2013.01); *G06F 9/44505* (2013.01)

(56) References Cited

U.S. PATENT DOCUMENTS

| | | |
|---|---|---|
| 7,290,164 B1 | 10/2007 | Harvey et al. |
| 7,457,853 B1 | 11/2008 | Chari et al. |
| 7,596,620 B1 | 9/2009 | Colton et al. |
| 7,844,903 B2 | 11/2010 | Dawkins et al. |
| 7,849,472 B1 | 12/2010 | Fuchs |
| 7,873,960 B2 | 1/2011 | Templin et al. |
| 8,244,874 B1 | 8/2012 | Thireault |
| 8,326,658 B1 | 12/2012 | Lee et al. |
| 8,331,362 B2 | 12/2012 | Shukla et al. |
| 8,825,817 B1 | 9/2014 | Jaisinghani et al. |
| 10,810,049 B2 | 10/2020 | Kramer et al. |
| 2002/0087734 A1 | 7/2002 | Marshall et al. |
| 2002/0120741 A1 | 8/2002 | Webb et al. |
| 2002/0152305 A1 | 10/2002 | Jackson et al. |
| 2002/0194251 A1 | 12/2002 | Richter et al. |
| 2003/0046396 A1 | 3/2003 | Richter et al. |
| 2004/0054690 A1* | 3/2004 | Hillerbrand ......... H04L 67/2819 |
| 2004/0210479 A1 | 10/2004 | Perkowski et al. |
| 2005/0021688 A1 | 1/2005 | Felts et al. |
| 2006/0050862 A1 | 3/2006 | Shen et al. |
| 2006/0075102 A1 | 4/2006 | Cupit |
| 2006/0080592 A1 | 4/2006 | Alves de Moura et al. |
| 2006/0195575 A1 | 8/2006 | Delany et al. |
| 2007/0016897 A1 | 1/2007 | Todd |
| 2007/0112574 A1 | 5/2007 | Greene |
| 2007/0233827 A1 | 10/2007 | McKnight |
| 2007/0260712 A1 | 11/2007 | Jibbe |
| 2008/0163171 A1 | 7/2008 | Chess et al. |
| 2008/0201467 A1 | 8/2008 | Delany et al. |
| 2008/0288239 A1 | 11/2008 | Bailey et al. |
| 2009/0064135 A1 | 3/2009 | Jimmerson |
| 2009/0077090 A1 | 3/2009 | Pacifici et al. |
| 2009/0217287 A1 | 8/2009 | Blum et al. |
| 2009/0327112 A1 | 12/2009 | Li et al. |
| 2010/0005529 A1 | 1/2010 | Hemade |
| 2010/0023934 A1 | 1/2010 | Sheehan et al. |
| 2010/0037287 A1 | 2/2010 | Netrakanti et al. |
| 2010/0050173 A1 | 2/2010 | Hensbergen |
| 2010/0110933 A1* | 5/2010 | Wilcock ................. G06Q 10/10 370/255 |
| 2010/0131324 A1 | 5/2010 | Ferris |
| 2010/0131624 A1 | 5/2010 | Ferris |
| 2010/0131625 A1 | 5/2010 | Dehaan et al. |
| 2010/0154024 A1 | 6/2010 | Boxmeyer et al. |
| 2010/0165876 A1 | 7/2010 | Shukla et al. |
| 2010/0318658 A1 | 12/2010 | Zorn et al. |
| 2011/0055395 A1 | 3/2011 | Wang et al. |
| 2011/0138047 A1 | 6/2011 | Brown et al. |
| 2011/0225467 A1 | 9/2011 | Betzler et al. |
| 2011/0258621 A1 | 10/2011 | Kern |
| 2011/0251992 A1 | 11/2011 | Bethlehem et al. |
| 2011/0296020 A1 | 12/2011 | Deng et al. |
| 2011/0296412 A1 | 12/2011 | Banga et al. |
| 2011/0296517 A1 | 12/2011 | Grigoriev et al. |
| 2011/0320574 A1 | 12/2011 | Felts |
| 2011/0320605 A1 | 12/2011 | Kramer et al. |
| 2012/0072597 A1 | 3/2012 | Teather et al. |
| 2012/0147894 A1 | 6/2012 | Mulligan et al. |
| 2012/0179808 A1 | 7/2012 | Bergkvist et al. |
| 2012/0233333 A1 | 9/2012 | Ganesan et al. |
| 2012/0240135 A1 | 9/2012 | Risbood et al. |
| 2013/0097651 A1 | 4/2013 | Rendahl et al. |
| 2013/0151710 A1 | 6/2013 | D'souza et al. |
| 2013/0159380 A1 | 6/2013 | Alam et al. |
| 2013/0167211 A1 | 6/2013 | Kamat |
| 2013/0212183 A1 | 8/2013 | Ward |
| 2013/0232480 A1 | 9/2013 | Winterfeldt et al. |
| 2013/0232498 A1* | 9/2013 | Mangtani .............. G06F 9/5038 718/104 |
| 2013/0283273 A1 | 10/2013 | Miyazaki |
| 2019/0034243 A1 | 1/2019 | Kramer et al. |

FOREIGN PATENT DOCUMENTS

| | | |
|---|---|---|
| JP | 2005056201 | 3/2005 |
| JP | 2005266917 | 9/2005 |
| JP | 2007193696 | 8/2007 |
| JP | 2009217321 | 9/2009 |
| JP | 2010140403 | 6/2010 |

OTHER PUBLICATIONS

U.S. Appl. No. 13/424,089, filed Mar. 19, 2012, Avinash Jaisinghani.
AWS Cloudformation user guide, api version May 15, 2010, pp. 1-468 (2013).
U.S. Appl. Serial No. 13/424,143, filed Mar. 19, 2012, Avinash Jaisinghani.
U.S. Application filed U.S. Appl. No. 14/473,037, filed Aug. 29, 2014, Avinash Jaisinghani.
Komathy K. et al., Component-based Security Model for XML Messaging Services, Nov. 6-8, 2002, IEEE, pp. 132-133.
Ankur Taly et al., Automated Analysis of Security-Critical JavaScript APIs, May 22-25, 2011, IEEE, pp. 363-378.
U.S. Appl. No. 13/424,160, filed Mar. 19, 2012, Reto Kramer.
Sascha Konrad et al., Using Security Patterns to Model and Analyze Security Requirements, 2003, Michigan State University, pp. 1-10.
Anil Jain et al., Biometric template security, Jan. 2008, ACM, vol. 2008, pp. 1-17.
U.S. Appl. No. 12/824,723, filed Jun. 28, 2010, Reto Kramer.
Cloud Computing. Delivered., RightScale Inc., Retrieved on May 7, 2010 at <<http://www.rightscale.com/>>, pp. 1-7.
"Open Virtualization Format", VMware Inc., Retrieved on May 7, 2010 at <<http://www.vmware.com/appliances/getting-started/learn/ovf.html>>, pp. 1-6.

* cited by examiner

USING SCRIPTS TO BOOTSTRAP APPLICATIONS WITH METADATA FROM A TEMPLATE

This application is a continuation of U.S. patent application Ser. No. 16/148,921, filed Oct. 1, 2018, which is a continuation of U.S. patent application Ser. No. 13/424,160, filed Mar. 19, 2012, now U.S. Pat. No. 10,089,152, which are hereby incorporated by reference herein in their entirety.

BACKGROUND

In the context of computer networking, web services and other computing services provide a way to access software functionality that can be reused for a variety of purposes by different clients. In recent years, numerous service providers have emerged which provide technologies that deliver computation, software, data access, and storage services that do not require end-user knowledge of the physical location and configuration of the system that delivers those services. Ordinarily, such network-accessible service providers deliver applications via the internet as a metered service on behalf of an owner of the application. These applications are typically accessed from web browsers, desktop and mobile apps by various end users, while the business software and data are stored on servers at a remote location that is managed by the service provider. In this manner, the owner of the application is relieved of the burden of having to build and maintain the various hardware and software infrastructure needed to run their application(s). In turn, this can cut down on costs and maintenance, improve reliability and scalability, and provide enhanced agility (time-to-market) for deploying new applications.

In this network-accessible service environment, configuring and bootstrapping applications has become a significant topic. An application owner typically needs a way to deploy, configure and execute the application on the servers of the service provider. Manually logging into remote servers over secure shell (SSH) or other means is not always a practical way for owners to manage this process. A more automated and user friendly approach is desirable.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for bootstrapping and configuring software. In particular, the various embodiments provide approaches for using templates to bootstrap software applications with configuration information.

In accordance with various embodiments, systems and methods are described for bootstrapping an application with metadata specified in a template. The template specifies a stack of resources that will be used to execute an application and also includes a set of metadata for customizing the resources and the application. When the system receives the template, it instantiates a compute node or server instance that will execute the application. In accordance with an embodiment, the compute node includes an operating system and the various files that will be pre-installed on the compute node. The compute node further includes at least one initialization script that bootstraps the application with the metadata contained in the template.

This functionality allows users to bootstrap the application running on the compute node with data from within the template that was used to create the stack containing the compute node. Metadata, configuration files, package names and versions can be passed by the application owner to the compute node (which may be located remotely with respect to the application owner) and all of this content will be downloaded and used by the initialization script.

In accordance with various embodiments, a stack is a set of resources on a network-accessible services provider, running together as a single unit. The stack can provide at least one network-accessible service (e.g. an application) to various clients and can include such resources as compute nodes (e.g. virtual machines or virtual server instances), databases, front-end machines, middleware (e.g. application servers, web servers, etc.), security modules, load balancers, queues, topics, subscriptions and others. In accordance with an embodiment, the resources of the stack are bundled together in a single definition and operate as a single unit to enable the network-accessible service. For example, a user that wishes to deploy a web application may create a stack that is comprised of a database, several compute node instances and a front end interface. The stack can be created and managed for the user on a network-accessible service provider that provides access to the stack for end users over a network such as the Internet. As used throughout this disclosure, the terms "network accessible service provider," or "service provider" are used interchangeably and are intended to mean any operator, system or other entity that provides and/or manages a set of services (e.g. applications, web sites, databases, etc.) on behalf of the clients or users of the provider.

Figure 1:
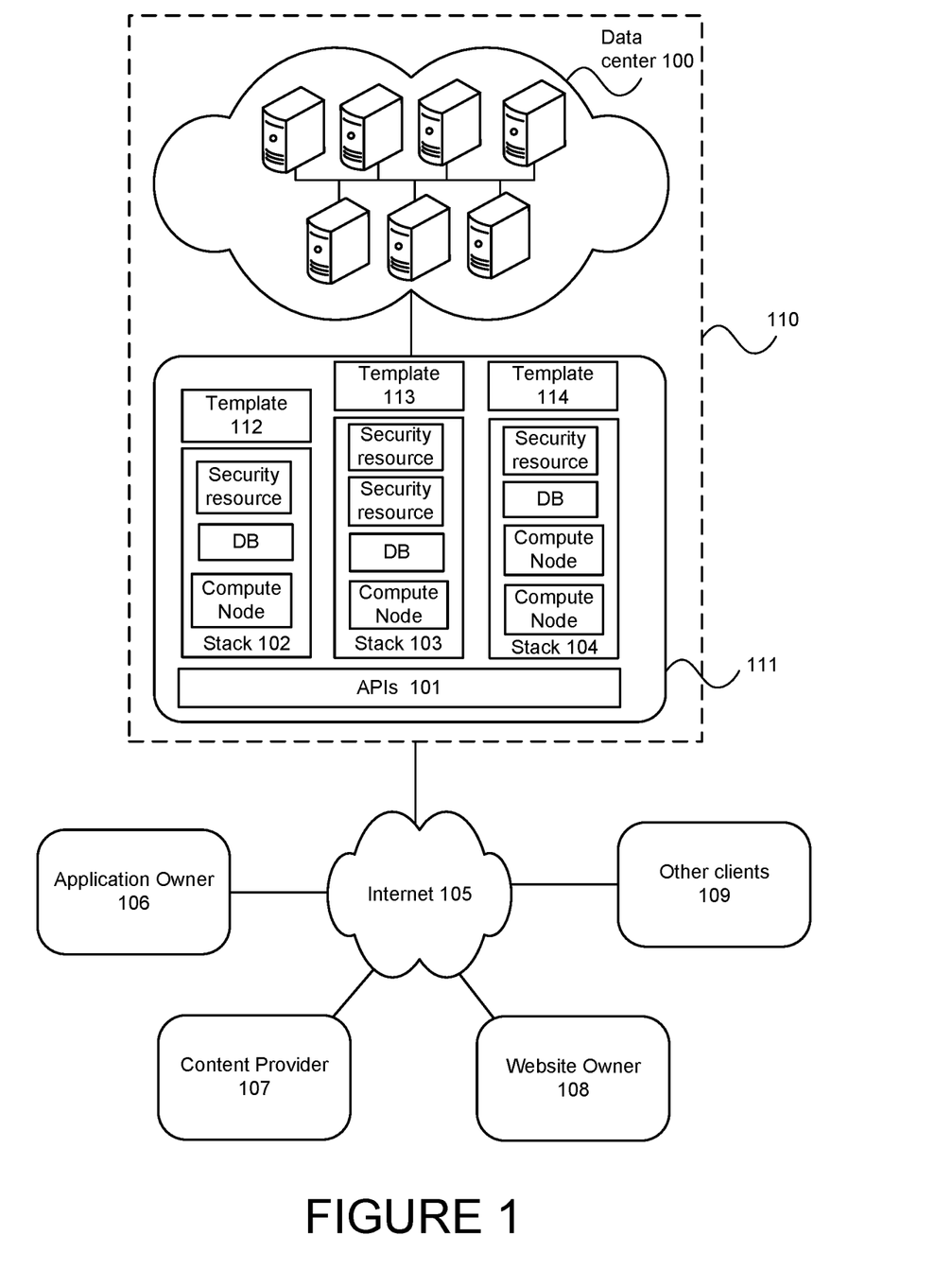
FIG. 1 is an illustration of a system environment that utilizes stacks of resources to provide a network-accessible service, in accordance with various embodiments.

FIG. 1 is an illustration of a system environment that utilizes stacks of resources to provide a network-accessible service, in accordance with various embodiments. As illustrated, a network-accessible service provider 110 can maintain a physical data center 100 that includes the various computer servers, data storage machines, network devices and other hardware resources necessary to provide the various network accessible services on behalf of the clients (106, 107, 108, 109) of the provider. In accordance with an embodiment, the service provider can expose its application programming interfaces (APIs) 101 to those clients in order to enable the clients to create, maintain and manage the resource stacks that can be used to run the services and applications over the Internet 105.

In accordance with an embodiment, each stack (102, 103, 104) represents a collection of resources needed to run the particular application or service. The resources can include server instances or compute nodes, databases, load balancers, notification service topics and subscriptions, security users, groups and policies, domain name system (DNS) records, elastic internet protocol (IP) addresses and various others. For example, a compute node can be a virtual machine that is created and managed by a service provider on behalf of its customer in order to meter the customer's application and its usage of the service provider's resources. In accordance with an embodiment, the compute node can be implemented as hardware, software or combination thereof, and can be associated with a particular computing capacity, storage capacity, cost per usage and the like. A database instance can be a resource for storing data that can be accessed by the compute node (e.g. server instance). An elastic IP address resource can be implemented as a reference that represents an IP address that can be moved from being assigned to one resource to being assigned to another resource.

In accordance with an embodiment, a resource (e.g. compute node, database, etc.) can be a virtual resource (e.g. a virtual compute node instance, a virtual database instance, etc.) created and managed by the service provider in order to meter the usage and charges for running the application on behalf of the client. Alternatively, the resource can be mapped to actual physical components (e.g. actual computer server, etc.).

In accordance with an embodiment, each stack is associated with a template (112, 113, 114). A template can be implemented as a Javascript Object Notation (JSON) formatted text file that describes the resources needed to execute an application or service along with any interconnection between them. Templates concisely capture resource relationships, such as the server instances that must be associated with a load balancer. The template can be parameterized to enable a single template to be used for many infrastructure deployments that have different configuration values, such as how many instances to spin up for the application. Templates can also provide output properties that can be used to easily communicate configuration or the results of deploying the template back to the user. For example, when instantiated, a template may provide the uniform resource locator (URL) of the load balancer endpoint that the client should use to connect to the newly instantiated application. In accordance with one embodiment, all resources in a template are identified using logical names, allowing multiple stacks to be created from a template without fear of naming collisions between resources.

In accordance with an embodiment, the template can be provided by the client using a console, a command line tool, an application programming interface (API), or any other means known in the art. Templates can be used to both create a resource stack, as well as update the resource stack when changes are needed.

In accordance with an embodiment, a stack (102, 103, 104) is the collection of resources that result from instantiating a template. A stack is created by supplying a template and any required parameters to the service formation system. Based on the template, the system determines what resources need to be created and in what order. The order can be determined by the dependencies specified between the resources declared in the template. Some of these dependencies are implicit, where a relationship between the resources implies a dependency. In other cases, the dependency is explicit, where the template author can define a dependency between the resources, ensuring one is created before the other.

In accordance with an embodiment, stacks can be created, updated and deleted using the service formation system 111. During stack creation, the system 111 can record the mapping from the logical name given in the template (e.g. 'myServer') to the actual name of the resource that is instantiated (e.g. instance name 'i-19d3ac161'). The stack creation status and resource name mappings can be made available via the API 101.

Figure 2:
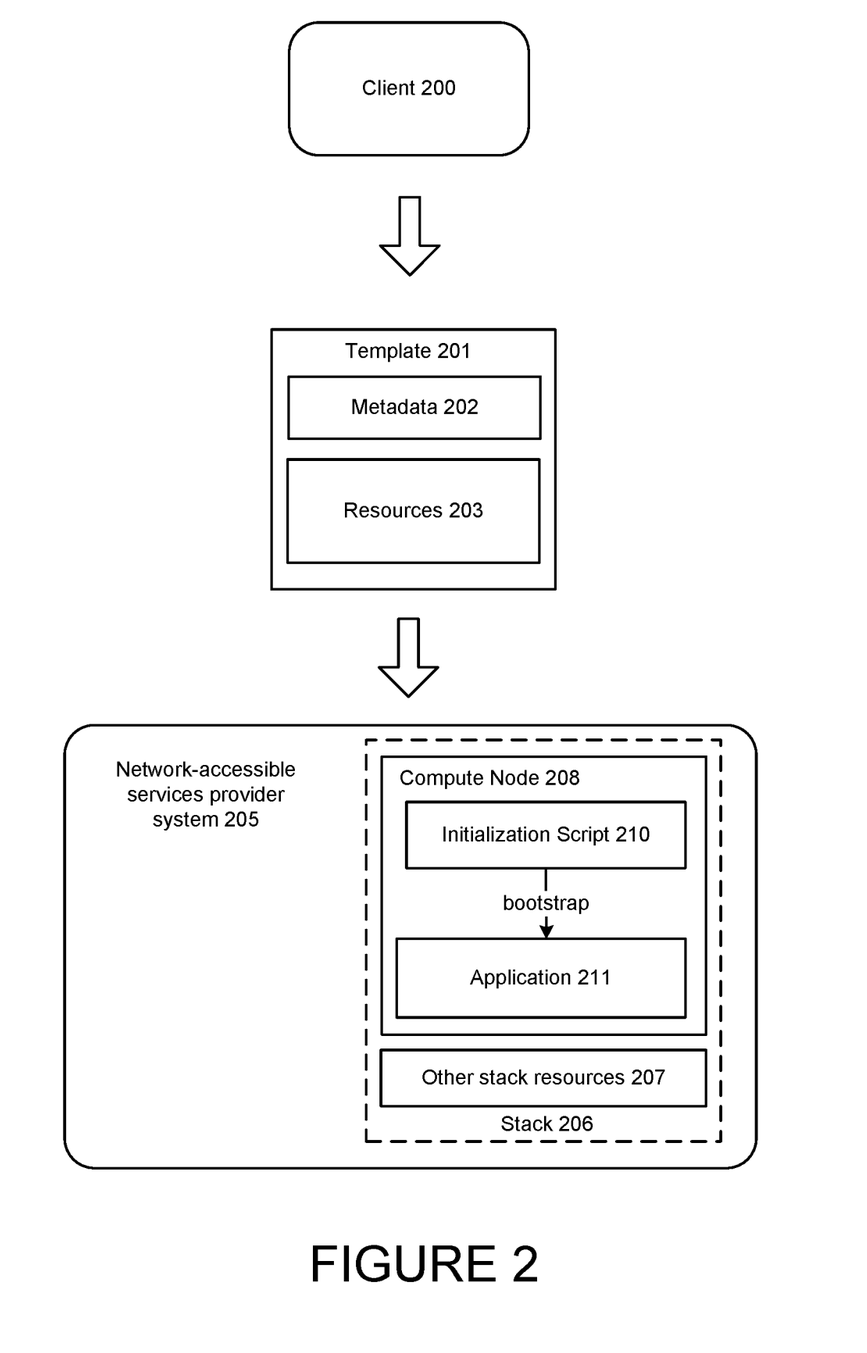
FIG. 2 is an illustration of using a template to bootstrap an application, in accordance with various embodiments of the invention.

FIG. 2 is an illustration of using a template to bootstrap an application, in accordance with various embodiments of the invention. As illustrated, a client 200 of the service provider can provide a template 201 that defines the resources 202 that will be used to execute the client's application. In accordance with an embodiment, the template also includes a set of metadata 202 for the stack of resources. The metadata can include configuration files, resource metadata and other information which can be used to specify the actions that should happen to the application and the compute node at boot time.

In accordance with an embodiment, when the service provider 205 receives the template file, it can parse the file and build the stack of resources 206 that are defined in the template and which will be used to execute the client's application. As previously described, a stack of resources can include the compute node instances (or other modules) that will be used to execute the application, a set of database instances that will store the data processed by the server, load balancers for distributing request traffic and various other resources 207.

In accordance with an embodiment, building the resources includes instantiating at least one compute node instance 208. The compute node 208 can be a software module that executes the application and manages its runtime environment. In accordance with an embodiment, the compute node can be a virtual instance that is associated with a predefined computing capacity and memory capacity defined by the service provider in order to meter the hardware usage of the provider's network by the client's application. For example, an application owner can obtain as many compute nodes as needed for the application to satisfy all the incoming end user requests and thereby pay only for the used compute and storage capacity.

In accordance with an embodiment, the compute node 208 can be loaded with an operating system, as well as any other software, configuration files or other file-based artifacts that will be pre-installed on the compute node 208. In accordance with an embodiment, the compute node includes at least one initialization script 210 that will be used to customize the server instance and the application 211 at launch time with the metadata 202 from the template. The initialization script thus allows a client of the service provider to download and install software without having to have the applications pre-installed on the compute node. In accordance with an embodiment, the initialization script can be implemented as a Python script that enables calls to the application programming interface (API) exposed by the service provider.

In addition, other scripts can be provided as part of preloading software on the compute node. For example, another script can enable a user to define hooks (user-defined actions) to perform at runtime when a particular condition occurs on the compute node. For example, a user may define that a service (application) is to be shut down and restarted on the compute node whenever a particular condition occurs (e.g. a piece of metadata changing, etc.). The ability to define hooks will be described in further detail below, in connection with FIG. 4.

Figure 3:
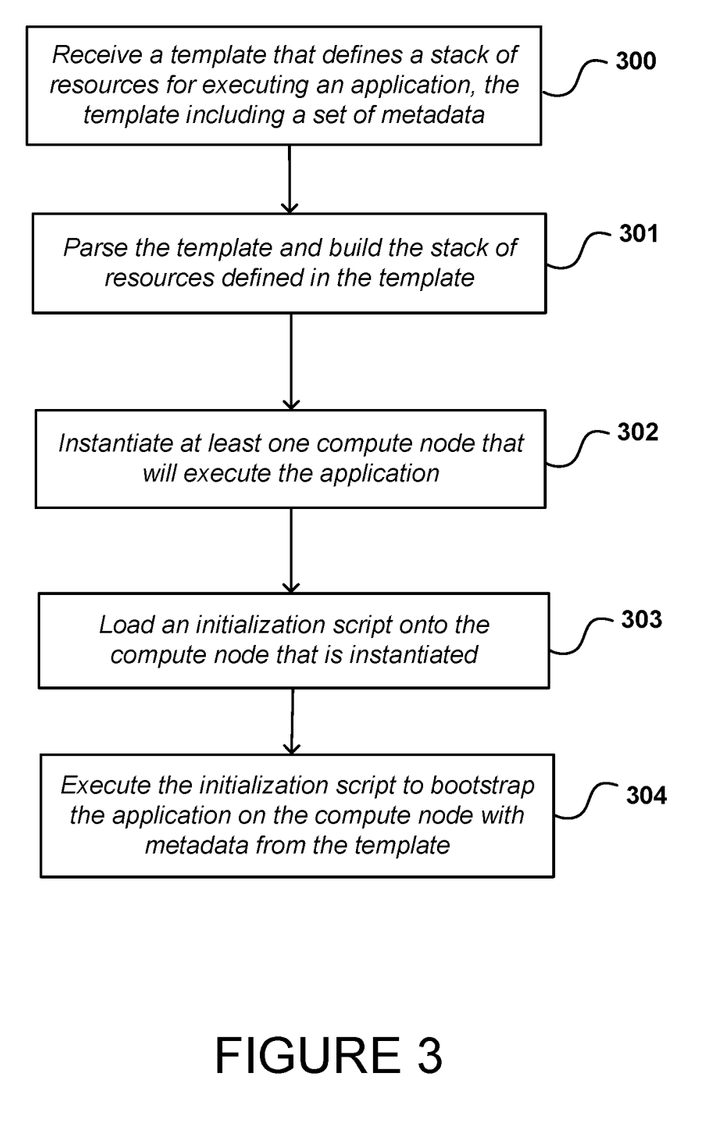
FIG. 3 illustrates an example process for using a script to bootstrap an application with metadata from a template, in accordance with various embodiments.

FIG. 3 illustrates an example process for using a script to bootstrap an application with metadata from a template, in accordance with various embodiments. Although this figure, as well as any other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

As shown in step 300, a user (e.g. application owner) can provide a template to the system. The template defines a stack of resources that will be used to execute the application and also includes a set of metadata. The metadata can include resource metadata for the stack resources, application configuration information for the application that will be executed on the stack and other information for customizing the resources and application.

In step 301, the system parses the template file and builds the stack of resources defined in the template. For example, the system can set up the database instance of the appropriate size for the application and set up the load balancers and other resources that will be needed for servicing end user traffic.

In step 302, the system instantiates at least one compute node that will be executing the application. In accordance with an embodiment, this step can be part of the building of resources defined in the template, or can be performed as a separate and independent step. The compute node can be any software module or component that is responsible of executing the application and providing a runtime environment for it. If multiple compute nodes are instantiated for the template, those compute nodes can share configuration information specified in the metadata or can alternatively be independently customized with its own specific metadata.

In step 303, an initialization script can be loaded (or pre-loaded) onto the compute node. In accordance with an embodiment, compute node contains the operating system to launch the application, as well as all software components that will be preinstalled on the compute node. In accordance with an embodiment, the initialization script will be used to provision the various resources.

In step 304, the initialization script is executed to bootstrap the application and the compute node with the metadata specified in the template. For example, if the template is for a web application, the stack metadata may indicate whether this particular stack is for a test application, a pre-production web application or a production web application. By using the initialization script, this metadata flows through to the compute node and the compute node can be made aware of its role as either a test server instance, preproduction instance or a production instance. Thus, for example, upon initializing the source files, the compute node would know that it is part of the test stack and would therefore download the source files from the application owner's test repository rather than the production or pre-production repository. Various other metadata and configuration information can be bootstrapped as well in accordance with the embodiments described herein.

Figure 4:
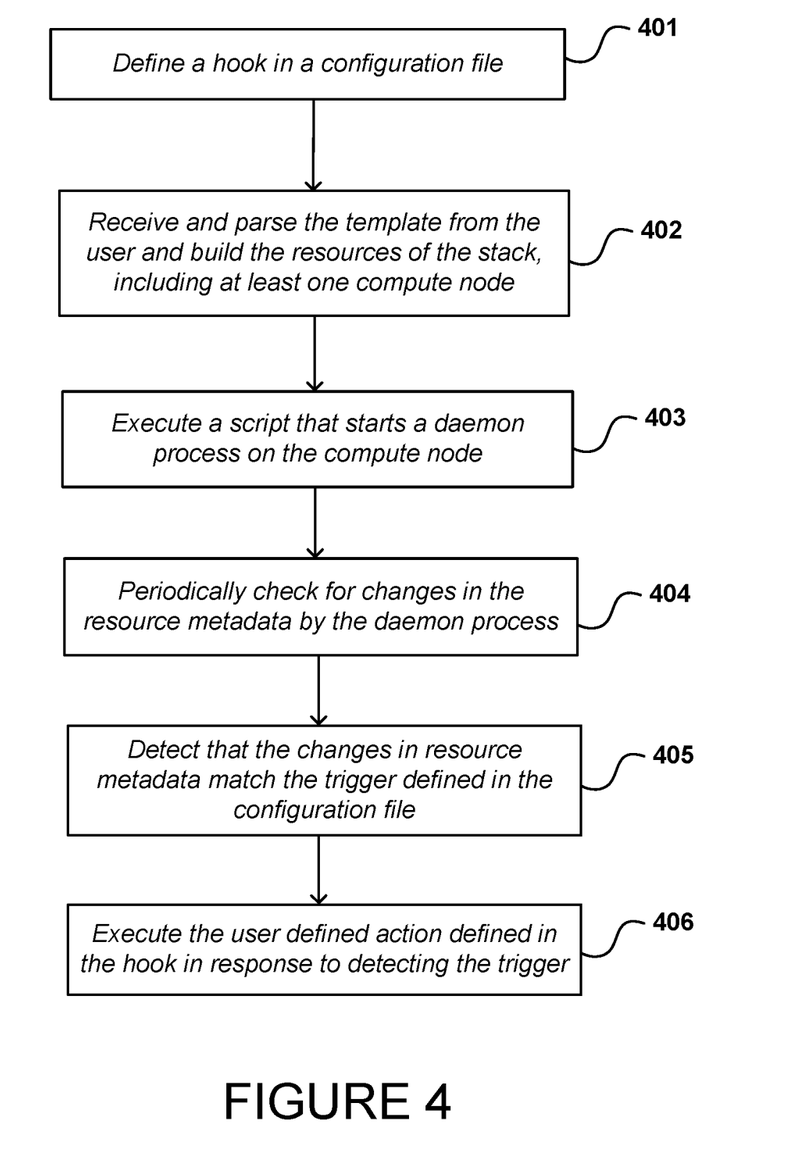
FIG. 4 is an example process for specifying and executing user-defined hooks, in accordance with various embodiments.

FIG. 4 is an example process for specifying and executing user-defined hooks, in accordance with various embodiments.

As shown in step 401, the user can define a hook (a user defined action) that will be performed when a certain condition is met. In accordance with an embodiment, the hook can be defined in a configuration file by specifying (1) a hook name that uniquely identifies the hook; (2) a set of triggers that specifies the list of conditions to detect at runtime; (3) an action to perform (e.g. a shell command to execute) when the trigger is detected; and (4) an optional user to run the command as. Various other options can be specified as well for the hook in the configuration file.

In accordance with an embodiment, the configuration file can be included in the template used to create the stack. For example, a path to the configuration file can be specified in the template, or alternatively, the information defining the hook can be directly included in the template file.

In step 402, the system receives and parses the template file from the user and builds the stack of resources according to the information contained therein. For example, the system can instantiate the compute nodes to execute the application and the database instances to store the data for the application, load balancers to distribute traffic to the resources, security groups and various others.

In step 403, upon instantiating the compute node, a script is executed that starts a daemon process. The daemon process executes as a background process on the compute node. In accordance with an embodiment, the daemon process can also be configured by identifying the stack name or unique ID of the stack of resources and setting an interval that will be used by the daemon process to check for changes to the resource metadata of the stack. For example, the interval can be set to check for changes every 10 minutes.

In step 404, the daemon process can periodically check for changes in the resource metadata, as previously described. The metadata that can be monitored can be specified in the configuration file. For example, the process can check for any add, update or remove actions based on the metadata of the resources.

In step 405, the process can detect that the changes in the resource metadata match the trigger defined in the configuration file that was included in the template. If the trigger does match, the process can execute the user defined action specified in the hook in response to the trigger (step 406). For example, the action can be an arbitrary shell command that was specified in the configuration file (e.g. a command to stop and restart the application on the compute node).

Figure 5:
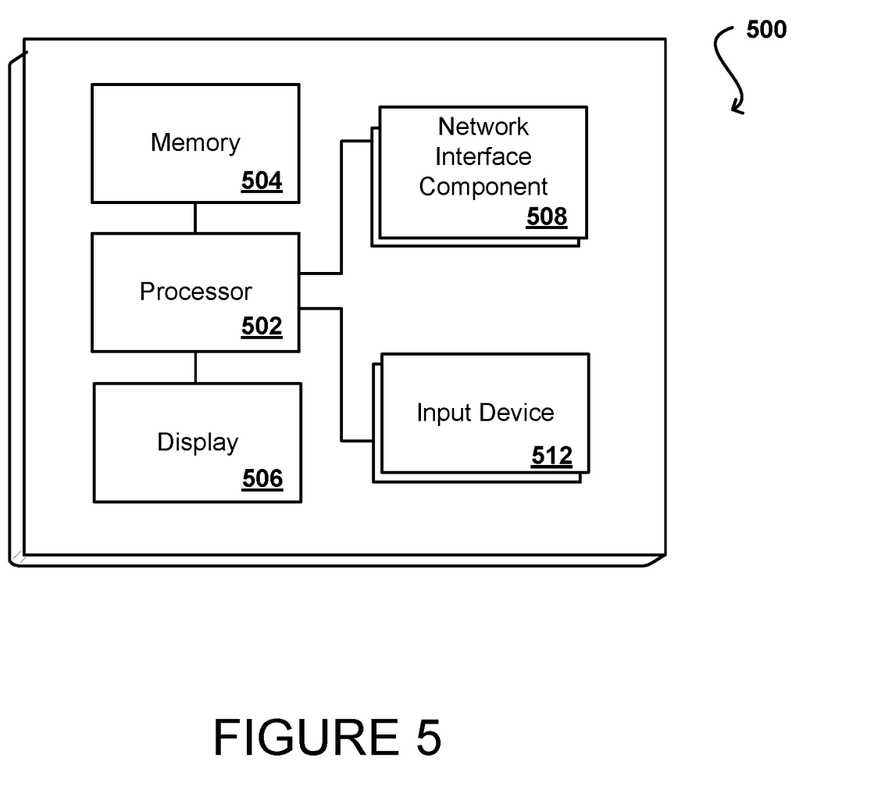
FIG. 5 illustrates a logical arrangement of a set of general components of an example computing device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
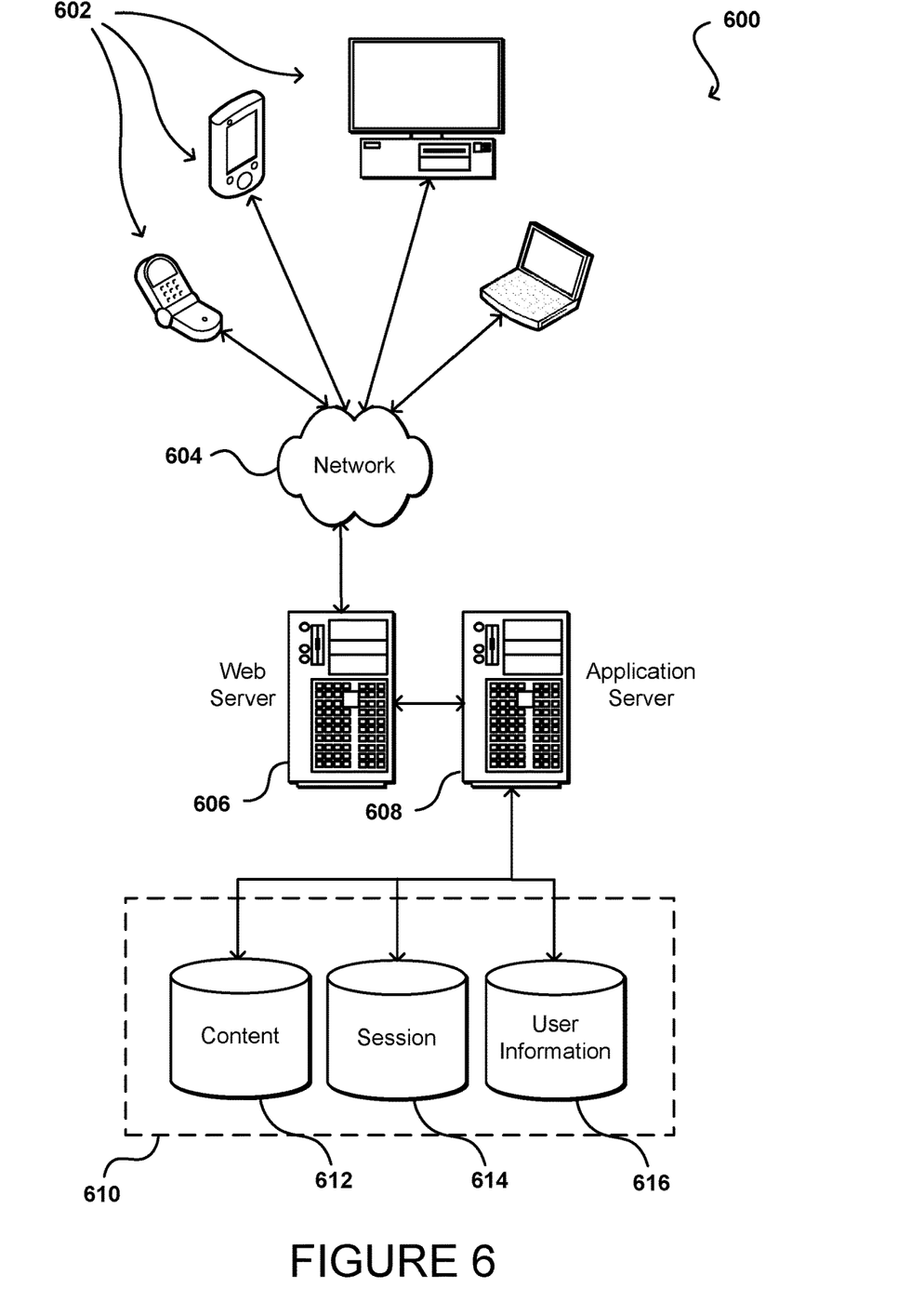
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
receiving a template at a service provider network of a service provider from a client of the service provider, wherein the template comprises:
a definition of a stack of resources comprising one or more compute nodes associated with execution of an application within the service provider network; and
information that defines a condition to be satisfied and an action to be performed, during boot time for the one or more compute nodes or for the application, on the one or more compute nodes or in regard to execution of the application on the stack of resources at the service provider network responsive to satisfaction of the condition, wherein the action defined by the information of the template is not to be performed if the condition is not satisfied;
creating, based at least in part on the definition included in the received template, the stack of resources at the service provider network to execute the application;
detecting satisfaction of the condition defined in the received template; and
responsive to detecting satisfaction of the condition defined in the received template, triggering performance of the action defined in the received template, the action to be performed, during boot time for the one or more compute nodes or for the application, on the one or more compute nodes or in regard to execution of the application.

2. The computer implemented method of claim 1, wherein one of the compute nodes of the stack of resources defined in the template includes an initialization script that upon execution causes bootstrapping of the application.

3. The computer implemented method of claim 1, wherein the action comprises execution of a command to stop and restart the application.

4. The computer implemented method of claim 1, wherein the template further comprises resource metadata for customizing the resources.

5. The computer implemented method of claim 4, wherein:
   detecting satisfaction of the condition comprises monitoring the resource metadata and detecting a change in the resource metadata that satisfies the condition; and
   performing the action is triggered responsive to detecting that the change in the resource metadata satisfies the condition.

6. The computer implemented method of claim 1, wherein the template further comprises metadata including application configuration information for customizing the application.

7. The computer implemented method of claim 1, wherein creating the stack of resources further comprises creating at least one resource of the stack of resources to meter usage of at least some of the resources of the stack of resources that are running the application.

8. One or more non-transitory computer readable storage media storing one or more sequences of instructions that are executable by one or more processors to implement a network accessible service provider system configured to:
   receive a template at a service provider network of the service provider system from a client of the service provider system, wherein the template comprises:
      a definition of a stack of resources comprising one or more compute nodes associated with execution of an application within the service provider network; and
      information that defines a condition to be satisfied and an action to be performed, during boot time for the one or more compute nodes or for the application, on the one or more compute nodes or in regard to execution of the application on the stack of resources at the service provider network responsive to satisfaction of the condition, wherein the action defined by the information of the template is not to be performed if the condition is not satisfied;
   create, based at least in part on the definition included in the template, the stack of resources at the service provider network to execute the application;
   detect satisfaction of the condition defined in the received template; and
   responsive to detection of satisfaction of the condition defined in the received template, trigger performance of the action defined in the received template, the action to be performed, during boot time for the one or more compute nodes or for the application, on the one or more compute nodes or in regard to execution of the application.

9. The one or more non-transitory computer readable storage media of claim 8, wherein one of the compute nodes of the stack of resources defined in the template includes an initialization script that upon execution causes bootstrapping of the application.

10. The one or more non-transitory computer readable storage media of claim 8, wherein the action comprises execution of a command to stop and restart the application.

11. The one or more non-transitory computer readable storage media of claim 8, wherein the template further comprises resource metadata for customizing the resources.

12. The one or more non-transitory computer readable storage media of claim 11, wherein:
   detection of satisfaction of the condition defined in the template comprises monitoring the resource metadata and detecting a change in the resource metadata that satisfies the condition, and
   performance of the action is triggered responsive to detection that the change in the resource metadata satisfies the condition.

13. The one or more non-transitory computer readable storage media of claim 8, wherein the template further comprises metadata including application configuration information for customizing the application.

14. The one or more non-transitory computer readable storage media of claim 8, wherein creation of the stack of resources further comprises creation of at least one resource of the stack of resources to meter usage of at least some of the resources of the stack of resources that are to run the application.

15. A network accessible service provider system comprising one or more processors configured to:
   receive a template at a service provider network of the service provider system from a client of the service provider system, wherein the template comprises:
      a definition of a stack of resources comprising one or more compute nodes associated with execution of an application within the service provider network; and
      information that defines a condition to be satisfied and an action to be performed, during boot time for the one or more compute nodes or for the application, on the one or more compute nodes or in regard to execution of the application on the stack of resources at the service provider network responsive to satisfaction of the condition, wherein the action defined by the information of the template is not to be performed if the condition is not satisfied;
   create, based at least in part on the definition included in the template, the stack of resources at the service provider network to execute the application;
   detect an occurrence of satisfaction of the condition defined in the received template; and
   responsive to detection of satisfaction of the condition defined in the received template, trigger performance of the action defined in the received template, the action to be performed, during boot time for the one or more compute nodes or for the application, on the one or more compute nodes or in regard to execution of the application.

16. The network accessible service provider system of claim 15, wherein one of the compute nodes of the stack of resources defined in the template includes an initialization script that upon execution causes bootstrapping of the application.

17. The network accessible service provider system of claim 15, wherein the action comprises execution of a command to stop and restart the application.

18. The network accessible service provider system of claim 15, wherein the template further comprises resource metadata for customizing the resources.

19. The network accessible service provider system of claim 18, wherein:
   detection of satisfaction of the condition defined in the template comprises monitoring the resource metadata and detection of a change in the resource metadata that satisfies the condition, and
   performance of the action is triggered responsive to detection that the change in the resource metadata satisfies the condition.

20. The network accessible service provider system of claim 15, wherein the template further comprises metadata including application configuration information for customizing the application.

\* \* \* \* \*